United States Patent
Hennig et al.

(10) Patent No.: US 8,672,404 B2
(45) Date of Patent: *Mar. 18, 2014

(54) PROFILE FOR FASTENING A COVER ON A VEHICULAR SEAT HEADREST

(71) Applicants: Lars Hennig, Leichlingen (DE); Axel Posnien, Burscheid (DE); Uwe Schulze, Leverkusen (DE)

(72) Inventors: Lars Hennig, Leichlingen (DE); Axel Posnien, Burscheid (DE); Uwe Schulze, Leverkusen (DE)

(73) Assignee: Johnson Controls GmbH, Burscheid (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/782,944

(22) Filed: Mar. 1, 2013

(65) Prior Publication Data

US 2013/0175834 A1   Jul. 11, 2013

Related U.S. Application Data

(62) Division of application No. 11/917,651, filed as application No. PCT/EP2006/004795 on May 20, 2006, now Pat. No. 8,388,062.

(30) Foreign Application Priority Data

Jun. 21, 2005   (DE) .......................... 10 2005 028 569

(51) Int. Cl.
*A47C 31/02*   (2006.01)

(52) U.S. Cl.
USPC ....................................... 297/218.3

(58) Field of Classification Search
USPC ............ 403/326, 330, 339; 297/218.1–218.5, 297/220

See application file for complete search history.

(56) References Cited

U.S. PATENT DOCUMENTS 5,401,075 A   3/1995   Venuto et al.

FOREIGN PATENT DOCUMENTS

| DE | 3920529 C1 | 8/1990 |
| DE | 19916542 C1 | 1/2001 |
| FR | 2686553 A1 | 7/1993 |
| FR | 2821029 A1 | 8/2002 |
| JP | H01104299 U | 7/1989 |
| JP | 2005000418 A | 1/2005 |
| JP | 2005118439 A | 5/2005 |

*Primary Examiner* — Joshua Kennedy
(74) *Attorney, Agent, or Firm* — Dickinson Wright PLLC

(57) ABSTRACT

A profile (9) which can be connected to a cover (4) serves to fasten the cover (4) on a supporting body (2). According to the invention, it is provided that the profile has a recess (17) for receiving a connecting region, in particular a seam (6), of cover segments (5.1, 5.2) of an at least two-piece cover.

14 Claims, 3 Drawing Sheets

PROFILE FOR FASTENING A COVER ON A VEHICULAR SEAT HEADREST

CROSS REFERENCE TO RELATED APPLICATIONS

This divisional patent application claims the benefit of U.S. patent application Ser. No. 11/917,651 filed Dec. 14, 2007 entitled "Profile For Fastening A Cover On A Vehicular Seat Headrest" which claims the benefit of PCT/EP2006/004795 filed May 20, 2006 which claims the benefit of German Patent DE 10 2005 028 569 filed Jun. 21, 2005. The entire disclosures of each of the above applications are incorporated herein by reference.

FIELD OF THE INVENTION

The invention relates to a profile, which can be connected to a cover, for fastening the cover on a supporting body, to a fastening arrangement comprising said profile, and a headrest provided therewith.

RELATED ART

A profile of the type in question is disclosed in laid-open specification DE 199 16 542 C1 and serves to fasten a cover of a vehicle seat. The latter is provided with an encircling, U-shaped hook-in channel which has an essentially rectangular cross section. A latching lug which projects into said cross section is provided in order to engage behind a profile, which is inserted into the hook-in channel and is sewn to the cover, and to fix the cover in this way to the vehicle seat. The profile is overall of thin-walled design and its section which is engaged behind is formed in a curved manner, with that free end of the profile which points counter to the insertion direction therefore being supported on the latching lug. The cover has an overlapping region with the profile, through which the connecting seam is guided, and is deflected approximately at right angles at the associated end of the profile.

Arrangements of this type are unsatisfactory both in respect of appearance and with regard to installation in particular for the fastening of stiff covers (for example made of leather), which are generally composed of a number of parts, on supporting bodies of complex shape.

The invention is based on the problem of developing a profile of the type in question in such a manner that it is suitable for the fastening of multi-part covers of complex shape.

SUMMARY OF THE INVENTION

The problem is solved in the case of a profile which can be connected to a cover for fastening the cover on a supporting body, in that the profile has a recess for receiving a connecting region, in particular a seam, of cover segments of an at least two-piece cover.

The profile preferably has a first section, which can be inserted in a latching manner into a channel of the supporting body, a second section, which adjoins said first section, for sewing the profile to the cover, and then a third section with the recess. According to a particular development of the invention, the first profile section which can be inserted in a latching manner into the channel of the supporting body is arranged in a rotationally fixed manner in the channel and is supported preferably at least in two mutually, for example diagonally, opposite corner regions of the polygonal cross section of the channel. An exact alignment of the profile in the channel is thereby obtained. The alignment is particularly precise if the first profile section essentially fills the assigned region of the channel.

The second section is advantageously of thin-walled design in comparison to the first and third sections, thus facilitating sewing to the cover.

The recess may be formed in a corner region of the third section, which corner region faces the supporting body, and therefore the seam of the cover segments is surrounded in a U-shaped manner by two mutually adjacent surfaces of the profile and a surface of the supporting body.

In this case, the third section may be provided with a region, which is arranged between the recess and the second section, for deflecting the cover, for example by an angle of 90° to 130°.

The profile may be advantageously manufactured from a foamed plastic, such as polyethylene or polypropylene, preferably in the form of an endlessly extruded plastic strand. This material is reasonably priced and, owing to its elastic properties, does not tend to break when the cover is sewn on.

BRIEF DESCRIPTION OF THE DRAWINGS

The figures illustrate an embodiment of the invention by way of example and schematically.

In the figures.

DETAILED DESCRIPTION OF THE PREFERRED EMBODIMENT

Figure 1:
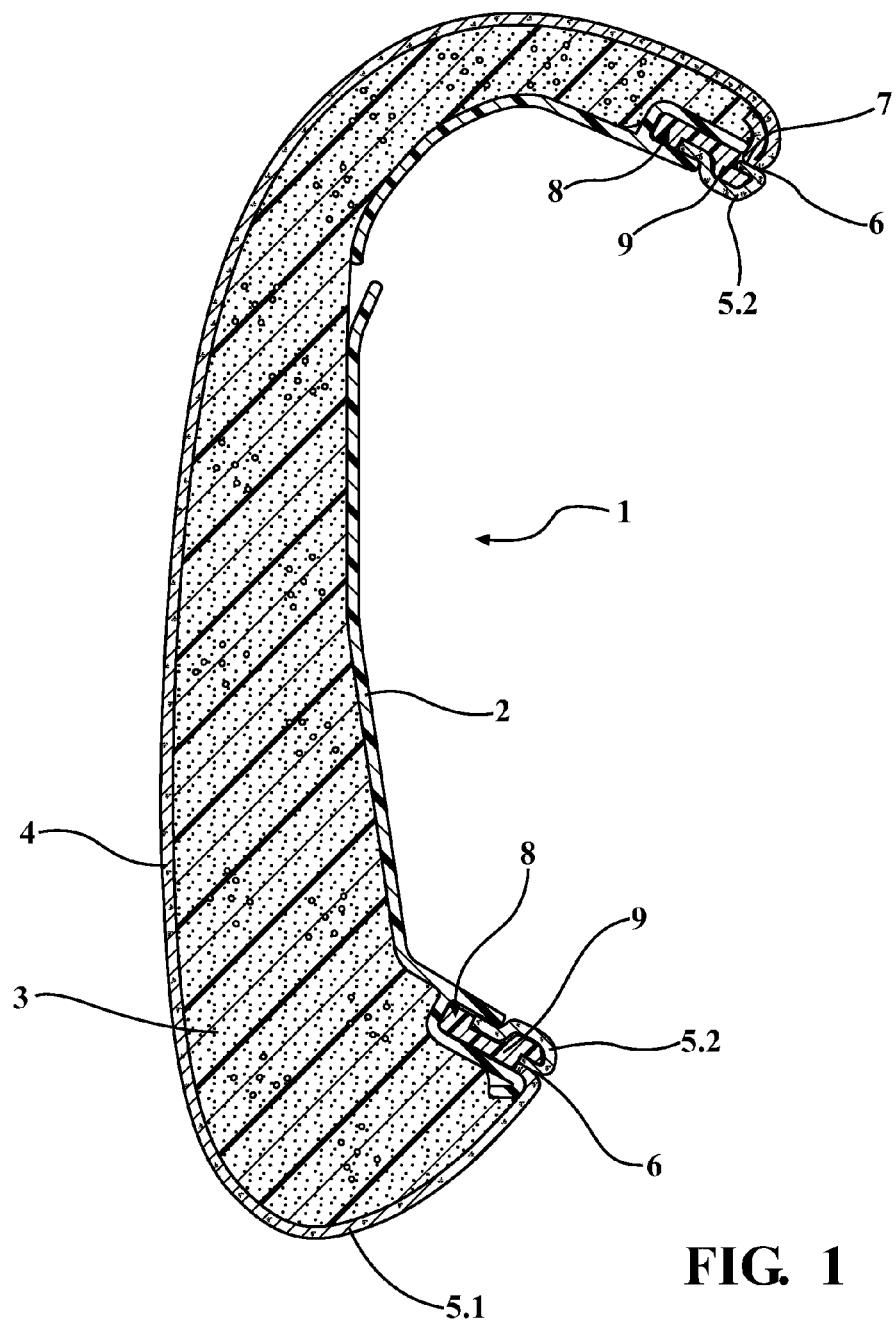
FIG. 1 shows a section through an upholstered body, which is provided with a cover, with the use of a profile designed according to the invention.

The upholstered body 1 illustrated in FIG. 1 is part of a vehicle seat headrest and comprises a supporting body 2, a foam part 3 and a cover 4, for example made of leather, which covers the foam part 3 on the visible side. Owing to its complex design, the cover 4 is composed of an outer cover segment 5.1 and an inner cover segment 5.2 which are connected to each other by means of an encircling seam 6. The seam 6 gives rise on the cover 4 to an inwardly projecting overlapping 7 of the cover segments 5.1 and 5.2.

The edge of the supporting body 2 forms a channel 8 which encircles it in a rectangular manner and in the manner of a frame and in which a profile 9 which is sewn to the inner cover segment 5.2 is latched. The profile 9 is not inserted into the channel 8 in a manner such that it encircles the entire circumference of the cover, but rather is arranged on the cover only in sections with the corner regions of the frame formed by the channel 8 being left out. The individual sections of the profile 9 are therefore only slightly bent in their longitudinal extent, if at all, upon insertion into the channel 8.

Figure 2:
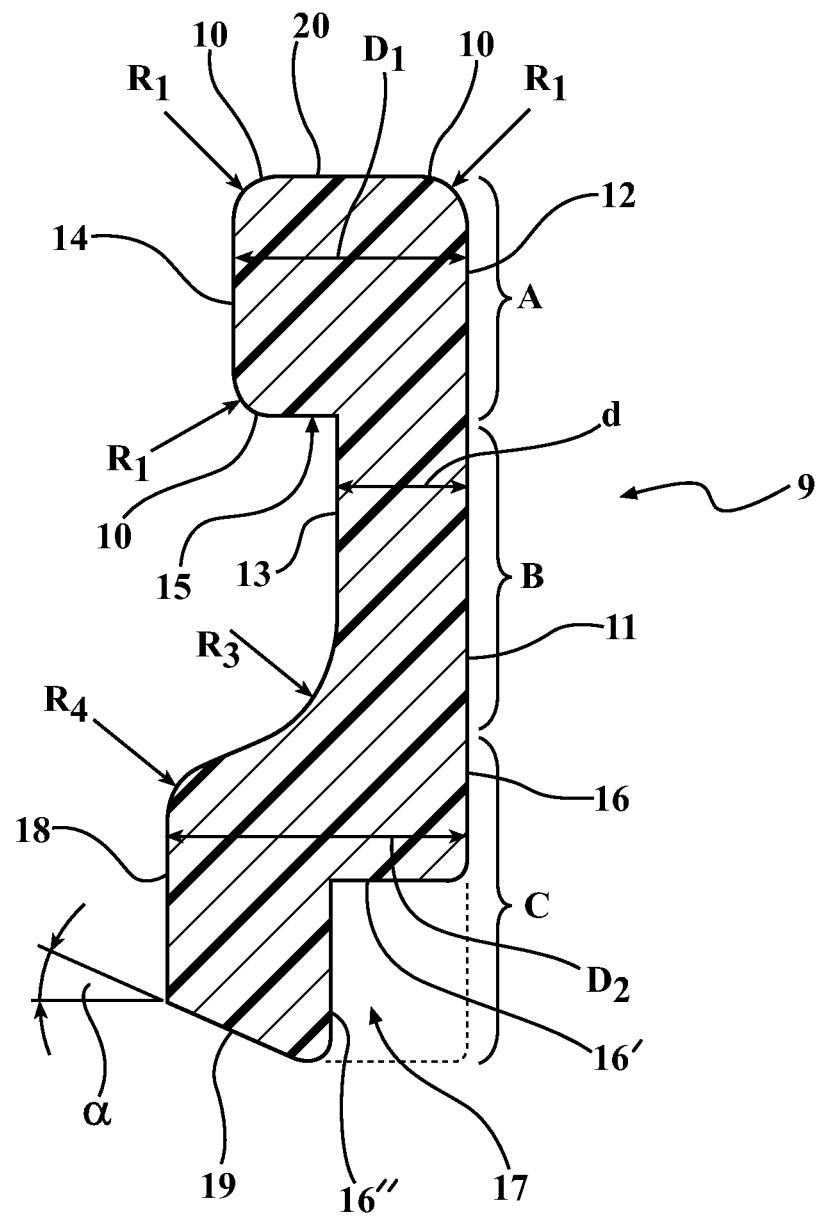
FIG. 2 shows a separate and enlarged section through the profile illustrated in FIG. 1.

The profile 9, which is manufactured from foamed polypropylene by extrusion, has, as is apparent from FIG. 2, a first rectangular section A, namely an approximately square section, with slightly rounded edges 10 (radii R1, R2), which section is formed compactly, except for the pores of the foam structure, i.e. does not have any further cavities, and is therefore relatively deformation-resistant. This section A serves for the latching in the channel 8. The section A is adjoined by a likewise compact, band-like section B, the one surface side 11 of which runs flush with the side surface 12 of the section A while the parallel surface side 13 of the section B has an offset 15 in relation to the other side surface 14 of the section A. The material thickness d in the region of the section B is therefore smaller than the material thickness D1 in the section A. In the exemplary embodiment, the material thickness d is approximately 55% of the material thickness D1.

As an extension of the section B, the profile 9 forms a section C, the side surface 16 of which initially constitutes an extension of the surface side 11 of the section B, but subsequently jumps back in relation thereto and forms a rectangular recess 17. The latter is arranged in the manner of a step (side surfaces 16', 16") in the corner region of the section C, which corner region is assigned to the side surface 16, the side surface 16" running in the region of the recess 17 approximately as an imaginary extension of the surface side 13 of the section B.

On the opposite side of the profile, the section C projects in relation to section B with a side surface 18 being formed which runs parallel to the opposite side surface 16 and is connected to the likewise parallel surface side 13 of the section B by an arrangement of a first concave radius R3 and an adjoining, convex radius R4. The side surface 18 is offset outward, again in parallel, in relation to the side surface 14 of the section A, and therefore the maximum material thickness D2 in the section C is greater than the material thickness D1. In the exemplary embodiment, the material thickness D2 is approximately 1.3 times the material thickness D1. In the region opposite the recess 17, the side surface 18 is adjoined by an oblique surface 19 which runs outward in the direction of the recess 17 and opens into the latter. The oblique surface 19 therefore lies opposite the end surface 20, which connects the side surfaces 12, 14, of the section A and runs at an inclination in relation to said end surface. The angle of inclination cc is approximately 25°. The section C is also formed compactly, apart from the pores of the foam structure.

Figure 3:
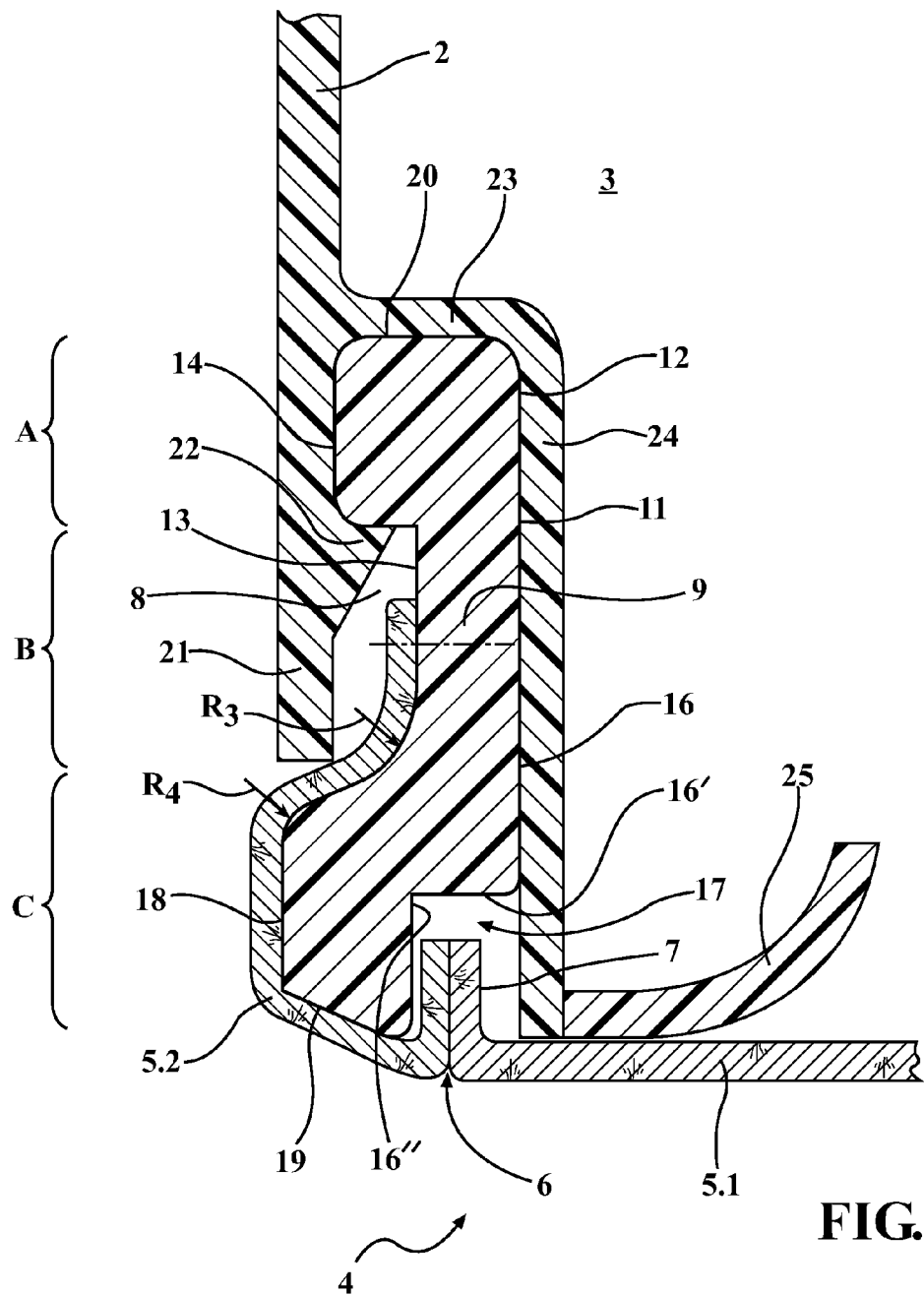
FIG. 3 shows the profile according to FIG. 2 in its fitted state.

The channel 8, which is molded onto the end side of the supporting body 2, preferably although not necessarily by injection molding, in order to receive the profile 9, is of approximately U-shaped design, with a shorter limb 21 (FIG. 3) being equipped with a latching lug 22 protruding inward into the channel 8. The latching lug 22 engages behind the offset 15 of the profile 9, with that part of the limb 21 which is located on this side of the latching lug 22, and the base 23 and the other limb 24 of the U-shaped channel 8 nestling against the side surfaces 12, 14 and the end surface 20 of the profile 9 under a slight stress. Section A of the profile 9 fills the relevant, approximately square cross section of the channel 8 apart from its corner regions. By this means, the profile 9 is held both in respect of its insertion direction and in a rotationally fixed manner in the channel 8.

While the shorter limb 21 extends on that side of the latching lug 22 until over the section B of the profile 9, the parallel, longer limb 24 still runs along the surface side 11 and the side surface 16 as far as the end of the section C. It is provided there with a bent portion 25 which runs in an oppositely curved manner from the profile 9 and peters out in the foam part 3. The outwardly open recess 17 is therefore bounded by three mutually adjacent walls, namely the side surfaces 16' and 16" of the profile 9 and the limb 24 of the supporting body 2.

The inner cover segment 5.2 is sewn in the region of the section B to the profile 9, the cover 4 bearing against the profile 9 and being spaced apart from the limb 21. The foamed polypropylene of the profile 9 is not damaged in the process. The cover segment 5.2 is led out of the gap between section B and the limb 21 along the radii R3 and R4 and subsequently bears against the side surface 18 and the oblique surface 19 of the profile 9. In this region, the cover 4 is deflected by an angle of around 115° in the direction of the foam part 3. The seam 6 which connects the cover segments 5.1 and 5.2 to each other is arranged in such a manner that the overlapping 7 projects into the recess 17. An annoying, outwardly protruding bead is therefore not formed in the visible region of the seam 6, and therefore an attractive appearance is maintained even in the corner regions of the encircling frame formed by the channel 8. Furthermore, ripples in the cover 4 are avoided by the fixing of the profile 9 in an essentially rotationally fixed manner (with elastic deformations being ignored).

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

REFERENCE NUMBERS

1 Upholstered body
2 Supporting body
3 Foam part
4 Cover
5.1, 5.2 Cover segment
6 Seam
7 Overlapping
8 Channel
9 Profile
10 Edge
11 Surface side
12 Side surface
13 Surface side
14 Side surface
15 Offset
16 Side surface
17 Recess
18 Side surface
19 Oblique surface
20 End surface
21 Limb
22 Latching lug
23 Base
24 Limb
25 Bent portion

What is claimed is:

1. An apparatus attaching at least two distinct segments (5.1, 5.2) of a cover connected at a seam (6) to a supporting body (2) comprising: a profile (9) having a first section (A) in latching engagement with a channel (8) of the supporting body (2) in a rotationally fixed manner in the channel (8) and a second section (B) adjoining the first section (A), the second section (B) being directly sewn to one of the cover segments (5.2), and a third section (C) adjoining the second section (B) in spaced relationship from the first section (A) wherein the third section (C) has a recess (17) facing the supporting body (2) receiving the seam (6) of the cover segments (5.1, 5.2) therebetween and wherein the third section (C) further includes a region between said recess (17) and said second section (13) deflecting the one of the cover segments (5.1, 5.2) sewn to the second section into the recess.

2. The apparatus as claimed in claim 1, wherein the first section (A) is supported at least in two corner regions of a polygonal cross section of the channel (8).

3. The apparatus as claimed in claim 2, wherein the first section (A) essentially fills a region of the channel (8).

4. The apparatus as claimed in claim 1, wherein the second section (B) is of thin-walled design in comparison to the first section (A) and the third section (C).

5. The apparatus as claimed in claim 1, wherein the recess (17) is formed in a corner region of the third section (C), which corner region faces the supporting body (2).

6. The apparatus as claimed in claim 1, wherein the third section (C) is provided with the region, which is arranged between the recess (17) and the second section (B), for deflecting the cover by an angle of 90° to 130°.

7. The apparatus as claimed in claim 1, wherein the profile (9) is extruded from a foamed plastic.

8. A headrest (1) comprising:
   a supporting body (2) having a peripheral edge defining a channel (8);
   a cover (4) having at least two distinct segments (5.1, 5.2) joined together along a seam (6);
   a profile (9) having a rectangular cross section and a first section (A) rotationally fixed within the channel (8) of the supporting body (2) and a second section (B) adjoining the first section (A) being directly sewn to one of the cover segments (5.2);
   and wherein the profile (9) including a third section (C) adjoining the second section (B) in spaced relationship from the first section (A) wherein the third section (C) has a recess (17) adjacent the supporting body for receiving the seam (6) of the cover segments (5.1, 5.2) therebetween and wherein the third section (C) further includes a region between said recess (17) and said second section (B) for deflecting the one of the cover segments (5.1, 5.2) sewn to the second section into the recess.

9. The headrest as claimed in claim 8, wherein the first section (A) is supported at least in two corner regions of a polygonal cross section of the channel (8).

10. The headrest as claimed in claim 9, wherein the first section (A) essentially fills the assigned region of the channel (8).

11. The headrest as claimed in claim 8, wherein the second section (B) is of thin-walled design in comparison to the first section (A) and the third section (C).

12. The headrest as claimed in claim 8, wherein the recess (17) is formed in a corner region of the third section (C), which corner region faces the supporting body (2).

13. The headrest as claimed in claim 8, wherein the third section (C) is provided with the region, which is arranged between the recess (17) and the second section (B), for deflecting the cover by an angle of 90° to 130°.

14. The headrest as claimed in claim 8, wherein the profile (9) is extruded from a foamed plastic.

\* \* \* \* \*